United States Patent
Lee

(10) Patent No.: US 10,249,861 B2
(45) Date of Patent: Apr. 2, 2019

(54) RECHARGEABLE BATTERY

(71) Applicant: Samsung SDI Co., Ltd., Yongin-si, Gyeonggi-do (KR)

(72) Inventor: Hye-Ran Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 74 days.

(21) Appl. No.: 15/154,604

(22) Filed: May 13, 2016

(65) Prior Publication Data

US 2016/0344005 A1    Nov. 24, 2016

(30) Foreign Application Priority Data

May 19, 2015  (KR) .................. 10-2015-0069829

(51) Int. Cl.
*H01M 2/12* (2006.01)
*H01M 2/04* (2006.01)

(52) U.S. Cl.
CPC ....... *H01M 2/1241* (2013.01); *H01M 2/0473* (2013.01); *H01M 2200/10* (2013.01); *H01M 2200/20* (2013.01)

(58) Field of Classification Search
CPC ........... H01M 2/1241; H01M 2200/10; H01M 2200/20; H01M 2/0473

USPC ........................................ 429/56
See application file for complete search history.

(56) References Cited

U.S. PATENT DOCUMENTS

| | | | | |
|---|---|---|---|---|
| 2004/0211053 A1* | 10/2004 | Trainer | ............... | H01M 2/0202 29/623.1 |
| 2006/0215334 A1* | 9/2006 | Hong | .................. | H01M 2/0426 361/15 |
| 2009/0305128 A1* | 12/2009 | Yeo | ..................... | H01M 2/0202 429/174 |

FOREIGN PATENT DOCUMENTS

| | | |
|---|---|---|
| KR | 10-2001-0008566 A | 2/2001 |
| KR | 10-2001-0056363 A | 7/2001 |
| KR | 10-2001-0069004 A | 7/2001 |
| KR | 10-0795680 B1 | 1/2008 |

* cited by examiner

*Primary Examiner* — Jonathan G Jelsma
*Assistant Examiner* — Omar M Kekia
(74) *Attorney, Agent, or Firm* — Knobbe, Martens, Olson & Bear, LLP

(57) ABSTRACT

Disclosed is a rechargeable battery including: an electrode assembly; a case having an opening at one side and including the electrode assembly; and a cap assembly including a cap plate for closing and sealing an opening of the case, wherein the cap assembly includes a vent portion that is welded with weaker welding strength in at least some of a boundary between the cap plate and the case than the rest.

16 Claims, 5 Drawing Sheets

RECHARGEABLE BATTERY

RELATED APPLICATIONS

This application claims priority to and the benefit of Korean Patent Application No. 10-2015-0069829 filed in the Korean Intellectual Property Office on May 19, 2015, the entire contents of which are incorporated herein by reference.

BACKGROUND

Field

The described technology relates generally to a rechargeable battery, and more particularly, to a reusable rechargeable battery.

Description of the Related Art

A rechargeable battery differs from a primary battery in that it can be repeatedly charged and discharged, while the latter is incapable of being recharged. Low-capacity rechargeable batteries are used in small portable electronic devices such as mobile phones, notebook computers, and camcorders, while high-capacity rechargeable batteries are widely used as a power source for driving a motor of a hybrid vehicle.

In the case of rechargeable batteries equipped in vehicles, there is not as much space limitation in contrast to those equipped in small electronic devices. Accordingly, when heat is generated inside a rechargeable battery, a vent hole including a corresponding portion to be ruptured at a predetermined pressure can be formed at one side of the rechargeable battery.

However, as a rechargeable battery equipped in small electronic devices becomes smaller, it may be difficult to form such a vent hole. Therefore, when the heat is generated inside the rechargeable battery, the rechargeable battery may ignite and an internal pressure thereof may continuously increase and then it may explode.

The above information disclosed in this Background section is only to enhance the understanding of the background of the invention, and therefore it may contain information that does not form the prior art that is already known in this country to a person of ordinary skill in the art.

SUMMARY OF CERTAIN INVENTIVE ASPECTS

An exemplary embodiment has been made in an effort to provide a rechargeable battery that can prevent internal pressure from being excessively increased.

A rechargeable battery according to an exemplary embodiment includes: an electrode assembly; a case having an opening at one side and including the electrode assembly; and a cap assembly including a cap plate for closing and sealing an opening of the case, wherein the cap assembly includes a vent portion that is welded with weaker welding strength in at least some of a boundary between the cap plate and the case than the rest of the boundary, wherein the vent portion has a welding strength that releases at a selected pressure.

The vent portion may be formed to be ruptured when heat of between 110° C. to 150° C. for about 6 to 7 minutes is generated inside the case.

A rechargeable battery according to another exemplary embodiment may include: an electrode assembly; a case having an opening at one side and including the electrode assembly; and a cap assembly including a cap plate for closing and sealing an opened portion of the case, wherein the cap assembly includes at least one protruding portion that protrudes from a circumferential surface of the cap plate.

The cap plate may have a pair of opposing short edges and a pair of opposing long edges, and the protruding portion may be formed at the long edge of the cap plate.

The at least one protruding portion comprises two protruding portions, and the two protruding portions may be respectively positioned at opposite lateral sides of the cap plate such that they are adjacent to each other.

The protruding portion may have a length of between 0.1 mm and 3 mm.

The cap assembly included in the rechargeable battery according to the exemplary embodiment includes the vent portion. Before the rechargeable battery is deformed by an external force and contact resistances between parts increase to cause internal resistance to rapidly increase such that high heat is generated to cause internal pressure of a case to excessively increase, the vent portion can be ruptured to decrease the pressure. Accordingly, the pressure inside the case can be prevented from excessively increasing and causing a powerful explosion.

DETAILED DESCRIPTION OF CERTAIN INVENTIVE EMBODIMENTS

Figure 1:
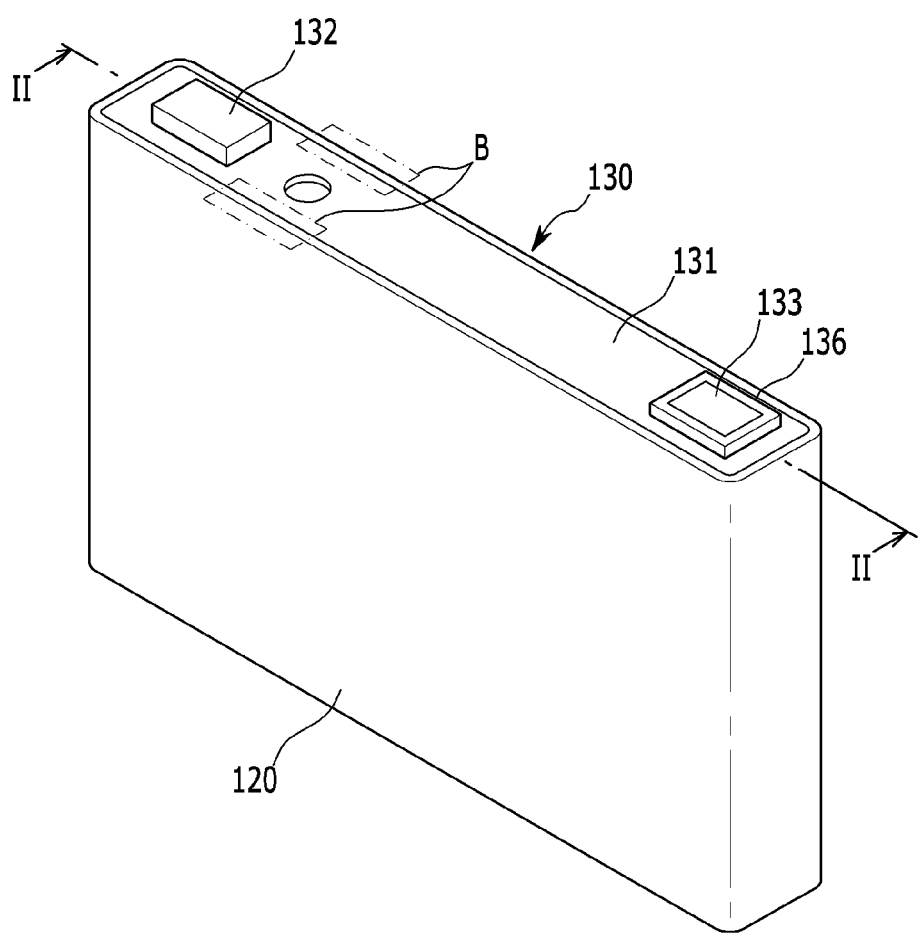
FIG. 1 is a perspective view of a rechargeable battery according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Further, in exemplary embodiments, for components having the same configuration, like reference numerals are used and described only in a representative embodiment, and in other exemplary embodiments, only different configurations from the representative embodiment will be described.

Throughout this specification and the claims that follow, when it is described that an element is "coupled" to another element, the element may be "directly coupled" to the other element or "indirectly coupled" to the other element through a third element. In addition, unless explicitly described to the contrary, the word "comprise" and variations such as "comprises" or "comprising" will be understood to imply the inclusion of stated elements but not the exclusion of any other elements.

Figure 2:
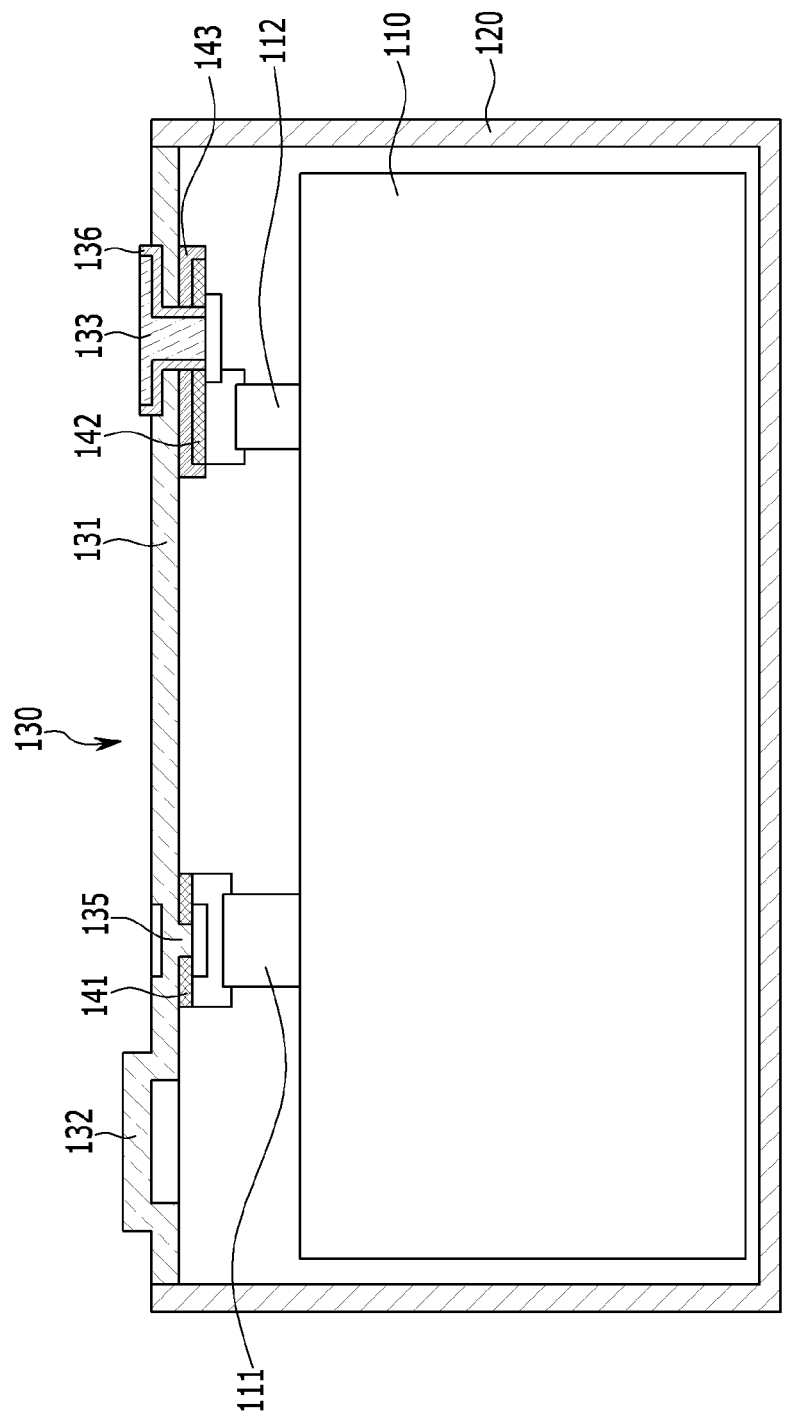
FIG. 2 is a cross-sectional view of a rechargeable battery according to the exemplary embodiment illustrated in FIG. 1 taken along the line II-II.

FIG. 1 is a perspective view of a rechargeable battery according to an exemplary embodiment, and FIG. 2 is a cross-sectional view of a rechargeable battery according to the exemplary embodiment illustrated in FIG. 1 taken along the line II-II.

Referring to FIGS. 1 and 2, the rechargeable battery 100 according to the exemplary embodiment includes an electrode assembly 110, a case 120, and a cap assembly 130.

The rechargeable battery 100 according to the current exemplary embodiment will be exemplarily described such that it has a prismatic shape as a lithium ion rechargeable battery. However, the present invention is not limited thereto, and the present invention may be applicable to various types of batteries such as a lithium polymer battery, a cylindrical battery, etc.

The electrode assembly 110 may include a first electrode 111 and a second electrode 112. The first electrode 111 may be a positive electrode, and the second electrode 112 may be a negative electrode. However, the first electrode 111 is not limited to being the positive electrode and the second electrode 112 is not limited to being the negative electrode, so they can be changed according to a design.

One side of the case 120 may be opened. The case 120 accommodates the electrode assembly 110. For this purpose, the case 120 may be formed such that it has a similar shape to that of the electrode assembly 110 and such that it is slightly larger than the electrode assembly 110. An opening is formed at a top surface of the case 120. The case 120 may be, for example, made from a metal such as aluminum, stainless steel, etc.

The cap assembly 130 closes and seals the opening of the case 120. For this purpose, the cap assembly 130 includes a cap plate 131. The cap plate 131 closes and seals the opening of the case 120. For this purpose, the cap plate 131 may have, for example, the same shape as the opening of the case 120.

A first terminal 132 and a second terminal 133 may be formed on top of the cap assembly 130.

The first terminal 132 and the second terminal 133 may be positioned to protrude outside of the cap plate 131. The first terminal 132 may be positioned in proximity to one end of the cap plate 131, while the second terminal 133 may be positioned in proximity to the other end of the cap plate 131. The first terminal 132 and the second terminal 133 may be charged such that they have different polarities.

The first terminal 132 may be integrally formed with the cap plate 131. That is, in a manufacturing process of the cap plate 131, the first terminal 132 may be manufactured together with the cap plate 131. However, it is not limited to the structure described above. A sealing member 136 may be interposed between the second terminal 133 and the cap plate 131. The sealing member 136 may be, for example, a gasket.

A first current collecting member 141 and a second current collecting member 142 may be combined to the cap assembly 130 therebelow.

The first current collecting member 141 is disposed below the cap assembly 130, and is connected to the first electrode 111. Since the first current collecting member 141 is connected to the first terminal 132 to be described later, the first current collecting member 141 may electrically couple the first electrode 111 and the first terminal 132. Accordingly, when the first electrode 111 is a negative electrode, the first terminal 132 may be connected with the negative electrode.

A coupling protrusion 135 may be formed at a lower part of the cap plate 131 so as to combine the first current collecting member 141 with the cap plate 131. The coupling protrusion 135 penetrates the first current collecting member 141. A hole that is penetrated by the coupling protrusion 135 may be formed in the first current collecting member 141.

The second current collecting member 142 is disposed below the cap assembly 130, and is connected to the second electrode 112. Since the second current collecting member 142 is connected to the second terminal 133 to be described later, the second current collecting member 142 may electrically couple the second electrode 112 and the second terminal 133. Accordingly, when the second electrode 112 is a positive electrode, the second terminal 133 may be connected with the positive electrode.

An insulating member 143 may be interposed between the second current collecting member 142 and the cap plate 131. The insulating member 143 prevents the second current collecting member 142 and the cap plate 131 from being electrically coupled to each other. For this purpose, the insulating member 143 may be made from a nonconductive material such as silicon, rubber, etc.

Further, the cap assembly 130 included in the rechargeable battery 100 according to the exemplary embodiment may include a vent portion B.

The vent portion B is welded with weaker welding strength in at least some of a boundary between the cap plate 131 and the case 120 than the rest. The vent portion B is formed to be ruptured when a predetermined pressure is generated inside the case 120.

For example, the vent portion B may be formed to be ruptured when heat of between 110° C. to 150° C. is generated for about 6 to 7 minutes.

In this case, the predetermined pressure is any pressure prior to the powerful explosion of the rechargeable battery. Accordingly, since a predetermined pressure range may vary depending on a manufacturer's design, it is not limited to a specific pressure value.

That is, before the rechargeable battery 100 is deformed by an external force and contact resistances between parts increase to cause internal resistance to rapidly increase such that high heat is generated to cause internal pressure of the case 120 to excessively increase, the vent portion B may be ruptured to decrease the pressure. Accordingly, the pressure inside the case 120 may be prevented from excessively increasing and thus leading to a powerful explosion.

Figure 3:
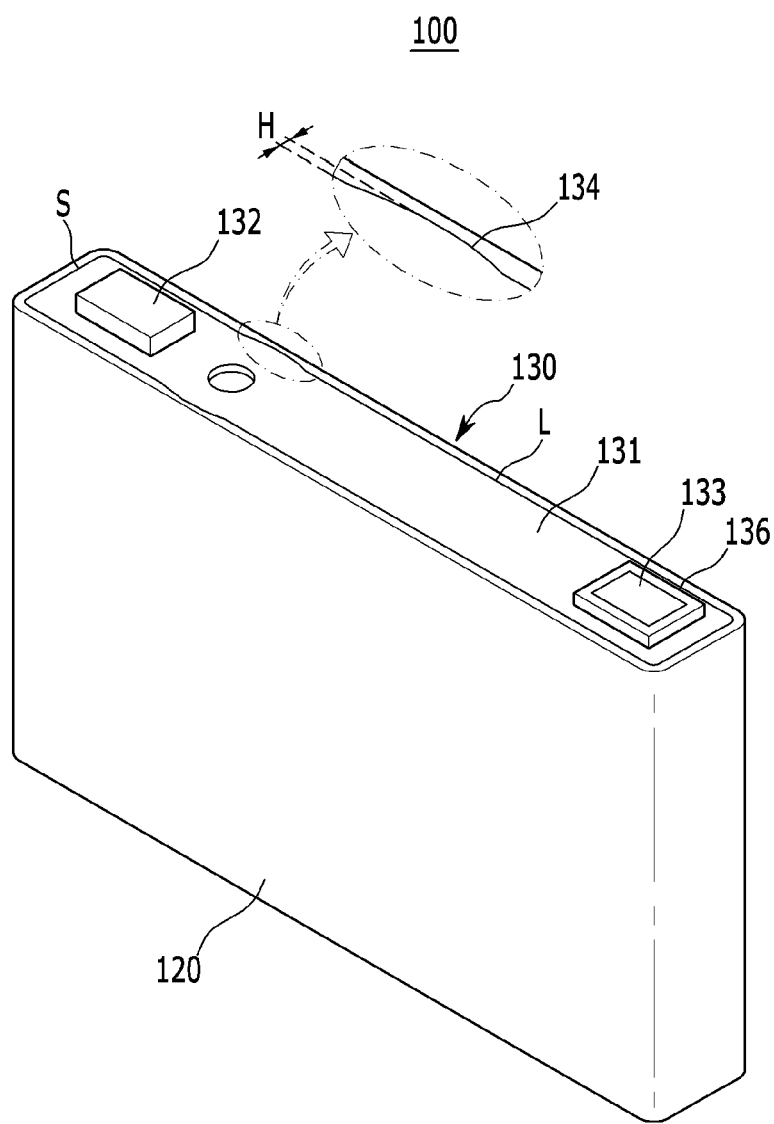
FIG. 3 is a perspective view of a rechargeable battery according to another exemplary embodiment.
Figure 4:
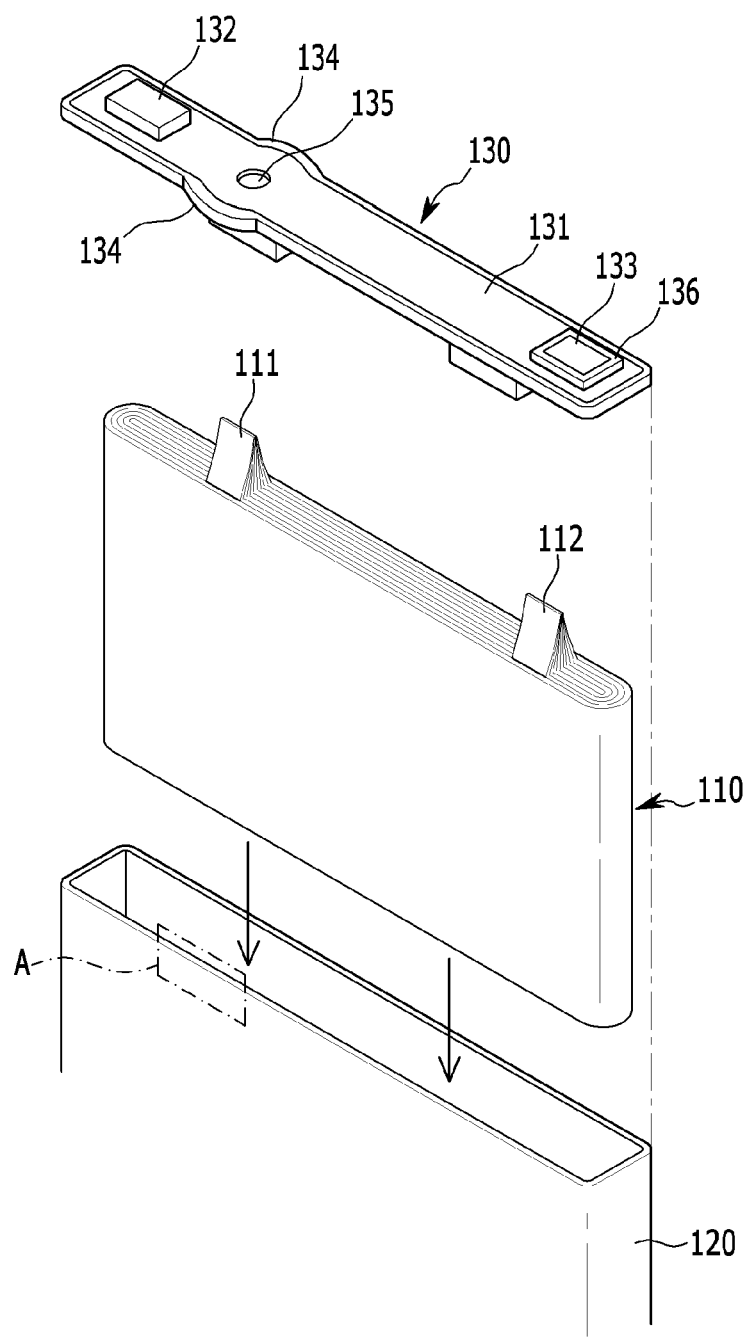
FIG. 4 is an exploded perspective view of the rechargeable battery according to the exemplary embodiment illustrated in FIG. 3.

FIG. 3 is a perspective view of a rechargeable battery according to another exemplary embodiment, and FIG. 4 is an exploded perspective view of the rechargeable battery according to the exemplary embodiment illustrated in FIG. 3.

Referring to FIGS. 3 and 4, a cap assembly 130 included in the rechargeable battery 100 according to the current exemplary embodiment may include at least one protruding portion 134.

The protruding portion 134 protrudes from at least one portion of a circumferential surface of a cap plate 131. More specifically, the cap plate may have a pair of opposing short edges and a pair of opposing long edges, and the protruding portion 134 may be formed at long edges of the cap plate 131.

In this case, the cap plate 131 may have a rectangular shape, as an example. Any two edges of the rectangular cap plate 131 may be short sides S that are relatively shorter than the other sides, while the other two edges may be long sides L that are relatively longer than the short sides S.

The protruding portion 134 allows a minute gap to be created between the cap plate 131 and the case 120. As a result, a portion formed with such a gap may have relatively weaker strength than the other portion when welding the cap plate 131 and the case 120.

For this purpose, a portion A of the case 120 combined to the protruding portion 134 may be a flat surface. More specifically, in order to combine the cap plate 131 and the case 120, the cap plate 131 and the case 120 are welded. In this case, the protruding portion 134 has a protruded shape, but the portion A of the case 120 welded to the protruding portion 134 is formed to have a flat shape that is not appropriate for receiving the protruding portion 134. Accordingly, before welding the cap plate 131 and the case 120 together, a minute gap may be created between the protruding portion 134 and the case 120.

In the rechargeable battery 100 according to the exemplary embodiment previously described, welding should be performed with varying welding strengths when welding the cap plate 131 and the case 120 together. However, in the case of the rechargeable battery 100 having the structure described above, welding can be performed without controlling the welding strength, so manufacturing work of the rechargeable battery 100 can be more easily performed than in that of the rechargeable battery 100 according to the exemplary previously described.

According to the structure described above, as in the rechargeable battery 100 according to the exemplary embodiment previously described, resistance inside the case 120 increases to thereby generate excessive pressure, so the portion formed with the protruding portion 134 may be ruptured to decrease the pressure.

Two protruding portions 134 are present, and the two protruding portions 134 may be respectively positioned at opposite lateral sides of the cap plate 131 such that they are adjacent to each other. The protruding portion 134 may have a length H of, for example, between 0.1 mm and 3 mm.

When the length H of the protruding portion 134 is less than 0.1 mm, it may be difficult to create the gap between the cap plate 131 and the case 120. In addition, when the length H of the protruding portion 134 exceeds 3 mm, the space between the cap plate 131 and the case 120 may excessively increase, thereby making it difficult to perform the welding work.

Figure 5:
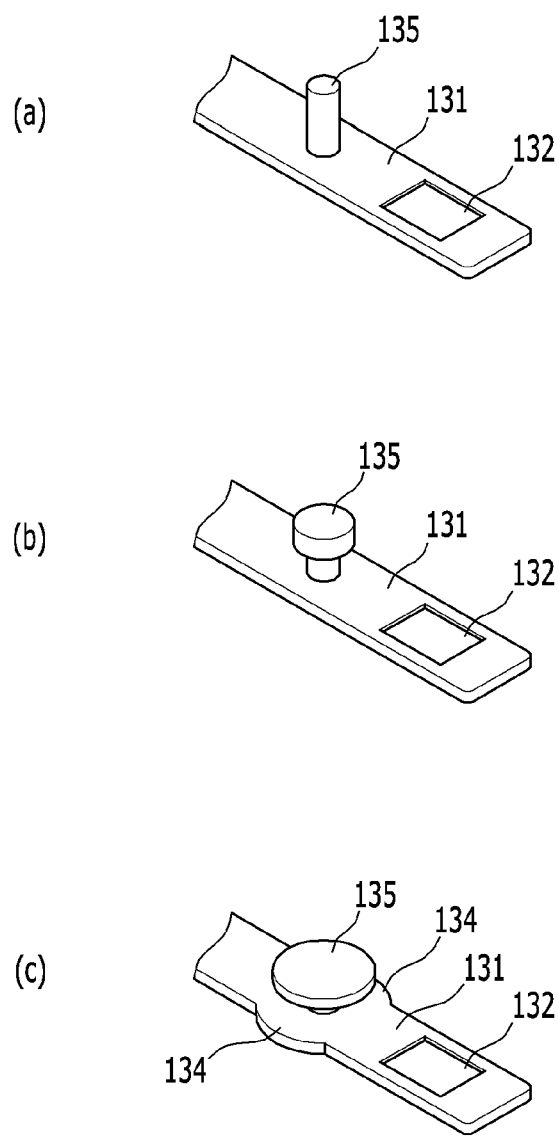
FIG. 5 is a drawing that illustrates a process of sequentially processing a coupling protrusion to combine a first current collecting member with a cap plate in the rechargeable battery according to the exemplary embodiment illustrated in FIG. 4.

FIG. 5 is a drawing that illustrates a process of sequentially processing a coupling protrusion to combine a first current collecting member with the cap plate in the rechargeable battery according to the exemplary embodiment illustrated in FIG. 4.

In FIG. 5, the first current collecting member is not illustrated for better comprehension and ease of description.

As illustrated in FIG. 5(*a*) to FIG. 5(*c*), the coupling protrusion 135 of the cap plate 131 is penetrated by the first current collecting member (not shown), and an impact is then delivered to an end portion of the coupling protrusion 135 using a separate tool. Since the coupling protrusion 135 and the cap plate 131 are integrally formed, the portion of the cap plate 131 where the coupling protrusion 135 is formed may be deformed to form the protruding portion 134.

As such, a separate process may not be performed to manufacture the protruding portion 134 described above, and the protruding portion 134 may be formed by default while performing the process of combining the first current collecting member (not shown) with the cap plate 131. Accordingly, the manufacturing cost can lower.

Referring back to FIG. 4, in the rechargeable battery 100 according to the exemplary embodiment having the structure described above, the cap assembly 130 includes the protruding portion 134. Accordingly, irrespective of a user's welding proficiency, when the cap plate 131 and the case 120 are welded using a general welding method, the welding strength may decrease by default in the portion where the protruding portion 134 is formed.

As a result, when ignition occurs and thus high pressure is generated inside the case 120, a boundary portion between the protruding portion 134 having the weaker welding strength than the periphery thereof and the case 120 may yield to the internal pressure of the rechargeable battery, thereby generating cracks and forestalling an explosion. Therefore, the pressure inside the rechargeable battery 100 may decrease. That is, the rechargeable battery 100 according to the exemplary embodiment may implement overpressure protection while having a small size.

While this disclosure has been described in connection with what is presently considered to be practical exemplary embodiments, The drawings and the detailed description of the present invention which are described above are merely illustrative, are just used for the purpose of describing the present invention, and are not used for qualifying the meaning or limiting the scope of the present invention, which is disclosed in the appended claims. Therefore, it will be understood by those skilled in the art that various modifications and other equivalent exemplary embodiments may be made from the present invention. Accordingly, an actual technical protection scope of the present invention is to be defined by the claims.

What is claimed is:

1. A rechargeable battery comprising:
   an electrode assembly;
   a case having an opening at one side and including the electrode assembly; and
   a cap assembly including:
      a cap plate for closing and sealing the opening of the case, wherein the cap plate comprises a circumferential surface,
      a vent portion that is welded with weaker welding strength in at least some of a boundary between the cap plate and the case than the rest of the boundary, wherein the vent portion has a welding strength that releases at a selected pressure, and
      at least one protruding portion that protrudes from the circumferential surface of the cap plate towards the inner wall of the case, and wherein the protruding portion corresponds to the vent portion of the cap assembly along a predetermined area of the circumferential surface.

2. The rechargeable battery of claim 1, wherein the vent portion is formed to be ruptured when heat of between 110° C. to 150° C. for about 6 to 7 minutes is generated inside the case.

3. A rechargeable battery comprising:
   an electrode assembly;
   a case having an opening at one side and including the electrode assembly; and
   a cap assembly including a cap plate for closing and sealing an opened portion of the case, wherein the cap assembly includes at least one protruding portion that protrudes from a circumferential surface of the cap plate, wherein the cap plate and at least one protruding portion are formed so as to be planar with each other, and wherein the cap assembly includes at least one vent portion that is welded with weaker welding strength in at least some of a boundary between the cap plate and the case than the rest of the boundary, and wherein at least one protruding portion corresponds to the vent portion of the cap assembly along a predetermined area of the circumferential surface.

4. The rechargeable battery of claim 3, wherein the cap plate has a pair of opposing short edges and a pair of opposing long edges, and the protruding portion is formed at the long edge of the cap plate.

5. The rechargeable battery of claim 4, wherein the at least one protruding portion comprises two protruding portions, and the two protruding portions are respectively positioned at opposite lateral sides of the cap plate such that they are adjacent to each other.

6. The rechargeable battery of claim 3, wherein the protruding portion has a length of between 0.1 mm and 3 mm.

7. The rechargeable battery of claim 3, wherein a portion of the case that is combined with the protruding portion has a flat surface.

8. A rechargeable battery comprising:
an electrode assembly;
a case having an opening at one side wherein the case receives the electrode assembly;
a cap plate that is positioned in the opening so as to seal the opening, wherein the cap plate has a circumferential surface and wherein the circumferential surface and the case define a boundary that is welded and wherein the cap plate has a protruding portion that protrudes from the circumferential surface that extends towards an inner wall of the case so as to reduce the thickness of the boundary portion along a predetermined area of the circumferential surface that corresponds to a vent portion of the boundary where the weld in the boundary portion is sized to rupture at a pre-selected pressure, wherein the cap plate and the at least one protruding portion are formed so as to be planar with each other.

9. The rechargeable battery of claim 8, wherein the case has a pair of opposed short side walls and a pair of opposed long side walls interconnecting the pair of opposed short side walls and wherein the protruding portion is formed adjacent one of the long side walls.

10. The rechargeable battery of claim 9, wherein the protruding portion comprises two protruding portions formed adjacent each of the opposed long side walls.

11. The rechargeable battery of claim 10, wherein the cap plate defines a coupling protrusion that extends into the case so as to be coupled to the electrode assembly and wherein the protruding portions are positioned on the cap plate adjacent the coupling protrusion.

12. The rechargeable battery of claim 11, wherein the two protruding portions are formed of the same material as the cap plate and are integrally attached thereto.

13. The rechargeable battery of claim 12, wherein the two protruding portions are deformed regions of the cap plate.

14. The rechargeable battery of claim 8, wherein the vent portion is formed to be ruptured when heat of between 110° C. and 150° C. for about 6 to 7 minutes is generated inside the case.

15. The rechargeable battery of claim 8, wherein the protruding portion has a length of between 0.1 mm and 3 mm.

16. The rechargeable battery of claim 8, wherein a portion of the case that is combined with the protruding portion has a flat surface.

* * * * *